United States Patent [19]

Jeanneret et al.

[11] Patent Number: 4,506,782
[45] Date of Patent: Mar. 26, 1985

[54] DEVICE FOR LONGITUDINALLY GUIDING AN ENDLESS WEB

[75] Inventors: Yves Jeanneret, Grandvaux; Jean-Louis Wenger, Puidoux, both of Switzerland

[73] Assignee: Bobst SA, Lausanne, Switzerland

[21] Appl. No.: 497,413

[22] Filed: May 24, 1983

[30] Foreign Application Priority Data

Jun. 2, 1982 [CH] Switzerland ............ 3375/82

[51] Int. Cl.$^3$ ............................................. B65G 39/16
[52] U.S. Cl. ...................................... 198/806; 226/18; 226/21
[58] Field of Search ................ 198/806, 807; 474/106, 474/122, 124; 226/15, 18–23

[56] References Cited

U.S. PATENT DOCUMENTS

| 2,305,036 | 12/1942 | Salfisberg | 198/806 |
| 2,553,473 | 5/1951 | Reimel | 474/106 |
| 2,797,091 | 8/1955 | Fife | 226/22 |
| 3,147,898 | 9/1964 | Huck | 474/106 |

FOREIGN PATENT DOCUMENTS 552697 4/1943 United Kingdom ............... 198/806

Primary Examiner—Joseph E. Valenza
Assistant Examiner—Kyle E. Shane
Attorney, Agent, or Firm—Hill, Van Santen, Steadman & Simpson

[57] ABSTRACT

A device for guiding an endless belt traveling in a frame of a conveyor comprising a pivot frame of a pair of side members interconnected by at least one cross-member spaced from one end of the side frames, a bearing housing attached to each of the side frames adjacent the other end and supporting a pair of pressure rollers and a lateral edge roller, a pair of rollers mounted on a axis positioned above the cross-member, a second pair of rollers mounted at said one end, and a pivot arrangement for mounting the frames so that a pivot point for the subframe passes through the center of the axis of the first pair of rolls and lies on the theoretical center line for the web.

3 Claims, 5 Drawing Figures

DEVICE FOR LONGITUDINALLY GUIDING AN ENDLESS WEB

BACKGROUND OF THE INVENTION

The present invention is directed to a device for longitudinally guiding an endless web or belt.

The use of an endless web, for instance, as an endless bolt conveyor, is well known. The cardboard industry, particularly the machines for processing folded boxes, use such belt conveyors for transporting and pressing the flow of boxes in a delivery station which boxes have been previously folded and glued. Usually a delivery station of a folder-gluer is made of a lower endless belt conveyor and an upper endless belt conveyor. The flow of boxes is transferred and pressed therebetween and the pressing, which occurs between the belts, may cause a lateral movement of the upper or lower belt conveyor until they touch the left or right side frame of the delivery station.

Several solutions have already been proposed to obtain a more or less satisfactory guiding of the endless belt conveyors. One of these solutions envisions the channelization of the edge of a belt conveyor using disk which have groooves. These disks with the grooves lie in a horizontal plane of the path of the return run of the conveyor belt and rotate on vertical axes. They are arranged in facing pairs in this plane with one pair at the start of the return path and the other at the end of the return path for the endless belt conveyor.

Another solution uses belt conveyors which are driven by cylinders with a slightly convex roller shape. This shape insures the automatic centering of the endless belt conveyor with great regard to the medium axis or center line of the delivery station.

A further solution proposes a range of rollers acting on the lateral edges of the endless belt conveyor. Unfortunately all of these constructions or solutions soon lead to damage to the conveyor. Since the belts of each of the conveyors is made of a synthetic material, the edges are very often hardened because of the friction with these devices and are often damaged by these guiding elements.

SUMMARY OF THE INVENTION

The present invention is directed to a device to give a secure longitudinal guiding of an endless belt conveyor and thus eliminate the drawbacks of known guiding devices. To accomplish these aims, the present invention is directed to a device for longitudinally guiding an endless web being disposed in a conveyor frame having at least one cross plate, said device comprises a subframe having a pair of side members with a cross-member spaced inward of one end of said side members, each side member at said other end having a bearing housing supporting a pair of pressure rollers for engaging opposite surfaces or sides of the web and a lateral guiding roller mounted on an axis perpendicular to the axes of the pressure rollers; first roll means mounted above the cross-member for engaging an upper surface of the web; second roll means mounted at said one end for engaging the lower surface of the web, each of said first and second roll means comprising an axle extending between the side members with a pair of rollers which are mounted thereon for independent rotation and have a width approximately one-half the distance between said side members of the subframe; and pivot means for mounting the subframe on the cross plate of the conveyor frame for rotation about a pivot axis disposed on the theoretical center line of the endless web and passing through the center of the theoretical axis for the first roll means, said pivot means including a bearing arrangement between said cross-member and cross plate and a pair of rollers mounted on the subframe at the cross-member for engaging the cross plate so that the endless web enters the subframe by passing between the pairs of pressure rollers at said other end before it passes underneath the rollers of the first roll means and over the rollers of the second roll means.

Preferably, each of the bearing housings is mounted on the side frames so that the axis of the lateral guide roller can be changed to change the amount of contact between the web and the pair of pressure rollers. Alsom the bearing arrangement preferably comprises a stud secured on the cross plate and having a cylindrical bearing surface received in a bearing opening formed in the cross-member.

DESCRIPTION OF THE PREFERRED EMBODIMENTS

Figure 1:
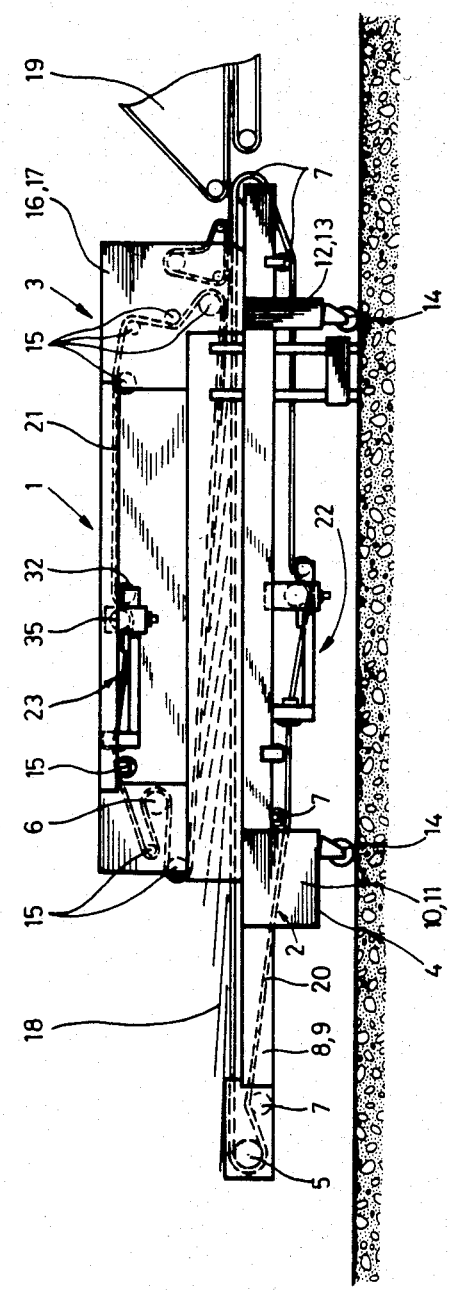
FIG. 1 is a side view of a delivery station utilizing the device of the present invention.

The principles of the present invention are particularly useful when incorporated in a delivery station generally indicated at 1 in FIG. 1. The delivery station 1 has a lower endless belt conveyor 2 and an upper endless belt conveyor 3. As illustrated, the lower endless belt conveyor 2 comprises a frame composed of two lateral beams 8 and 9 which are mounted on a main frame composed of frame members 10 and 11 which have legs such as 12 and 13 provided with wheels which allow movement of the delivery unit or device. To drive a lower belt 20, a drive roller 5 is mounted between the frame members 8 and 9 and a plurality of idler rolls 7 are mounted to extend between the members 8 and 9 to determine the path of the belt 20. The upper endless belt conveyor 3 also has a pair of frame members 16 and 17, which support a drive roller 6 and a plurality of idler rollers 15 which determine the path for the upper endless belt or web 21. The upper conveyor frame formed by the frame members 16 and 17 is arranged so that it can be shifted along the lower frame member as desired. To drive each of the conveyor belts 20 and 21, drive means which is illustrated as a box 4 is provided on the lower frame and has a chain (not illustrated) which drives both the drive roller 5 of the lower conveyor 2 and the driver roller 6 of the upper conveyor 3. In the unit 1, the folded and glued boxes 18 which have been processed in a folder-gluer 19 are received from the discharge end of the folder-gluer 19 and transported between the endless belts 20 and 21. The endless belt 20 has a guiding device 22 on its return run while the endless belt 21 has a guiding device 23 on its return run. It is noted that both the devices 22 and 23 are identical.

Figure 2:
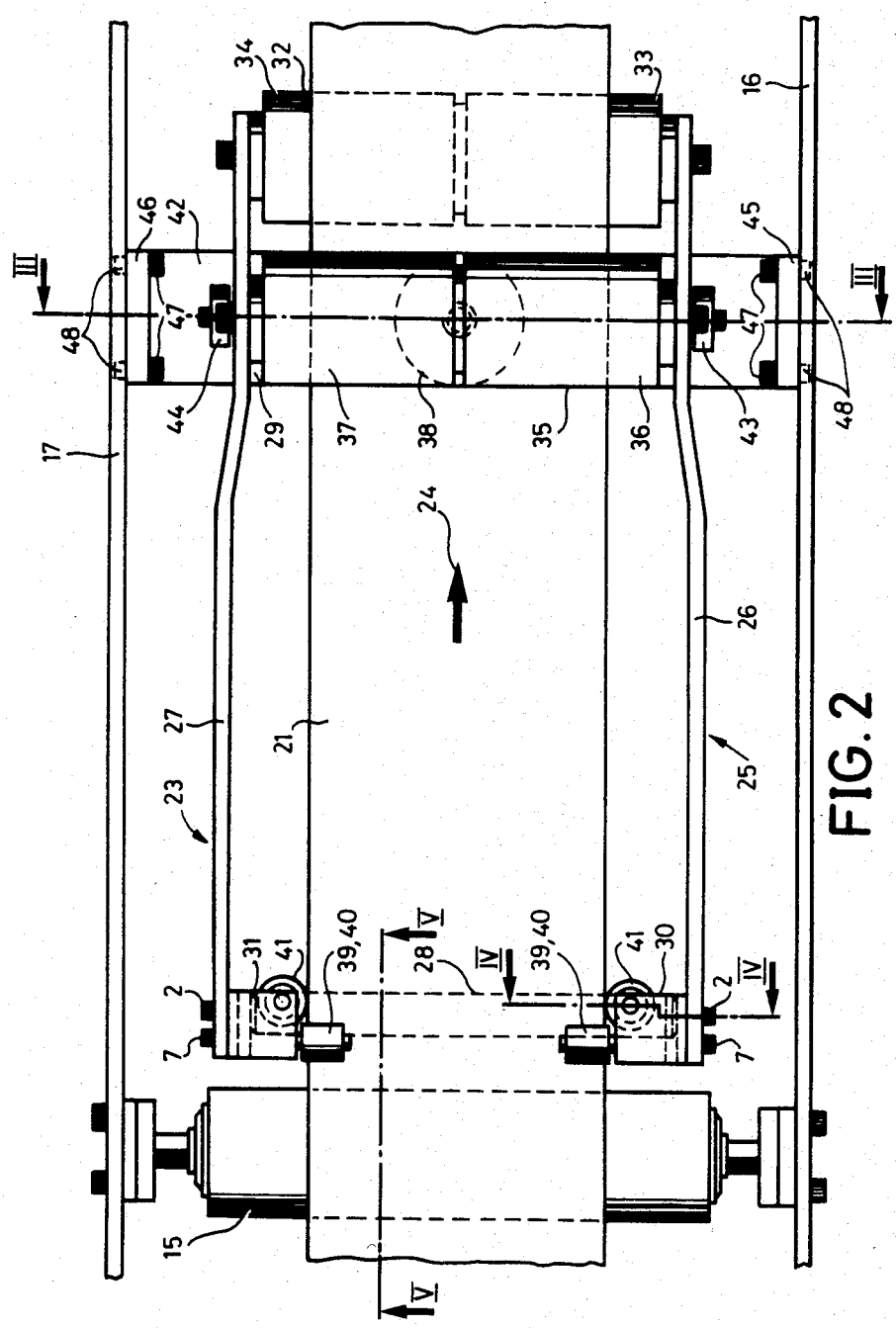
FIG. 2 is a partial plan view of the delivery station of FIG. 1 illustrating the device of the present invention.

As illustrated in FIG. 2, the guiding device 23 is provided on the return run of the conveyor belt or web 21. Thus, the belt is moving in the direction of arrow 24. The guiding device 23 includes a subframe 25 which comprises two lateral or side frame members 26 and 27 which are linked together by cross-members such as 28 and 29 (also see FIGS. 3 and 4). It should be noted that the cross-member 29, which has a rectangular cross-section, is spaced inward from one end of the side frame members 26 and 27. At the other end, each of the side members 26 and 27 are provided with bearing housings 30 and 31, respectively. Each of the bearing housings 30 and 31 mounts a pair of pressure rollers 39 and 40 which rotate on parallel axes and engage opposite surfaces of the web, and a lateral guiding roller 41, which rotates on an axis extending perpendicular to the axis of the rollers 39 and 40.

Figure 3:
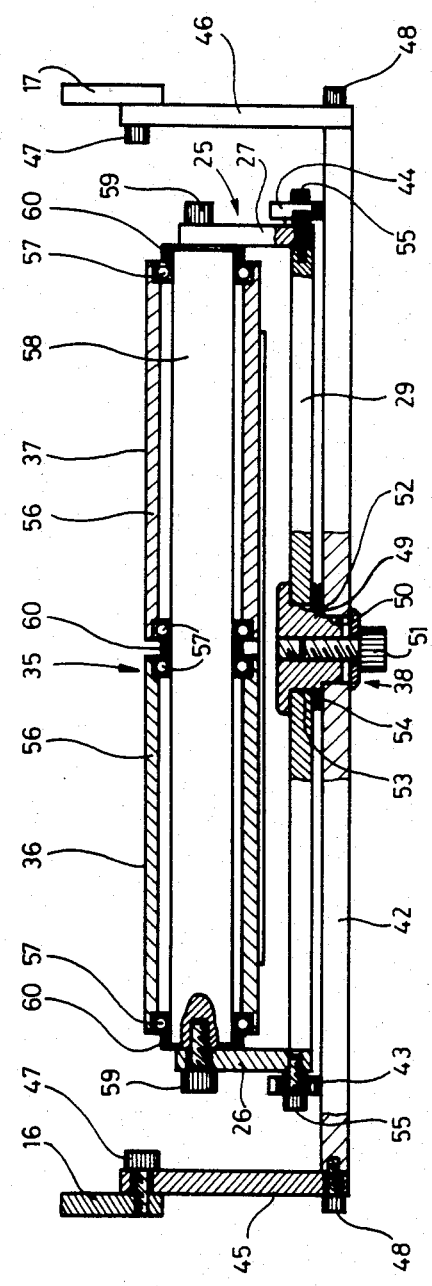
FIG. 3 is a cross-sectional view with portions in elevation for purposes of illustration taken along the lines III—III of FIG. 2.

Above the cross-member 29, the subframe 25 has a first roll means 35 and also a second roll means 32 at the one end. Each of these roll means 35 and 32 comprise a pair of rollers such as 36 and 37 for the first roll means 35 and the rollers 33 and 34 for the second roll means 32. Each of these rollers 33, 34, 36 and 37 have substantially the same structure and as best illustrated in FIG. 3, have a length which is approximately one-half of the distance between the two side members 26 and 27. As illustrated, each of the roll means 32 and 35 include an axle 58 which is mounted by threaded fasteners 59 to extend between the side members such as 26 and 27. The rollers 36 and 37 are cylindrical shells 56 which are mounted by roller bearings 57 on the axle 58. To maintain the desired spacing between the side members and between the shells, three spacers 60 are provided. Thus, each of the rollers such as 36 and 37 can rotate on the common axle 58 independently of each other.

To mount the subframe 25 in the frame of the upper conveyor, a pivot means including a bearing arrangement 38 is provided. The bearing arrangement 38 provides a pivotal connection which lies on the theoretical center line of the web 20 as well as passing through the center of the theoretical axis of the first roller means 35. As illustrated, the bearing arrangement 38 comprises a stud 49, which is secured in a bore 50 in a cross plate or piece 42 by a screw or threaded fastener 51. The stud 49 has a cylindrical part 52 which is received in a bearing surface formed by a bore 53 in a cross bar 29 of the subframe 25. In addition, the cylindrical surface 52 provides a shoulder and also receives a spacer 54 which provides the desired spacing between the cross-member 29 and the cross plate 42. The cross plate 42 is secured in the frame of the upper conveyor by extensions 45 and 46 which are secured by threaded fasteners 47 to the side frame members 16 and 17 and are also secured by fasteners 48 to the cross piece 42.

In addition to the bearing arrangement 38, the pivot means also include a pair of rollers 43 and 44 which are secured on the side members 26 and 27 of the subframe 25 and ride on an upper planar surface of the cross piece 42. As best illustrated in FIG. 2, these rollers 43 and 44 are on an axis that passes through the axis of the bearing arrangement 38 which also passes through the center of the axis of the first roll means 35.

Figure 4:
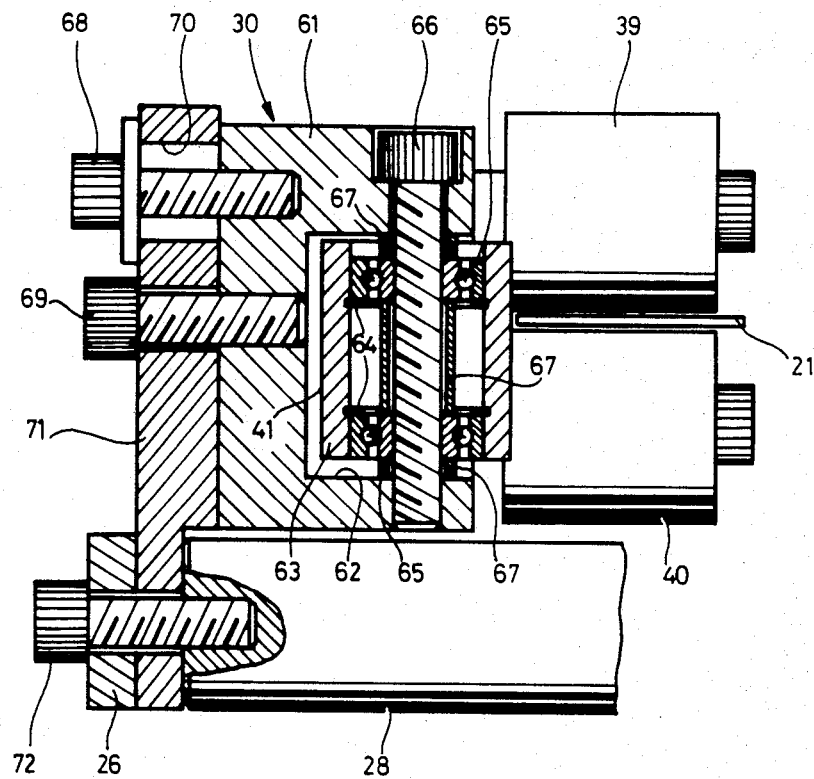
FIG. 4 is a cross-sectional view with portions in elevation for purposes of illustration taken along the lines IV—IV of FIG. 2.

The actual structure of each of the bearing housings 30 and 31 is best illustrated by the bearing housing 30 in FIG. 4. The bearing housing 30 has a body 61 which provides mounting for the two pressure rolls 39 and 40. In addition, it has a recess 62 for receiving the lateral guide roll 41. As illustrated, the lateral guide roll 41 comprises a sleeve 63 which is mounted on a pair of roller bearings 65 which are spaced apart by stop collar 64. The sleeve 63 plus spacers 67 are arranged on a threaded fastener 69 which is secured in the body 61.

The body 61 of the bearing housing 30 is secured on an upstanding support 71 by threaded fasteners 68 and 69. As illustrated, the threaded fastener 68 extends through an enlarged hole or aperture 70 which has approximately twice the diameter as the screw 68. Thus, the body 61 of the housing 30 can be pivoted around the axis of the fastener 69 by a distance controlled by the fastener 68 and the aperture 70. The support plate 71 is secured on the inner face of the lateral or side members 26 by screws 72 which are also holding the cross piece 28. It should be noted that the bearing housing 31 is a mirror image of the bearing housing 30 and its support plate is mounted on the frame member 27.

Figure 5:
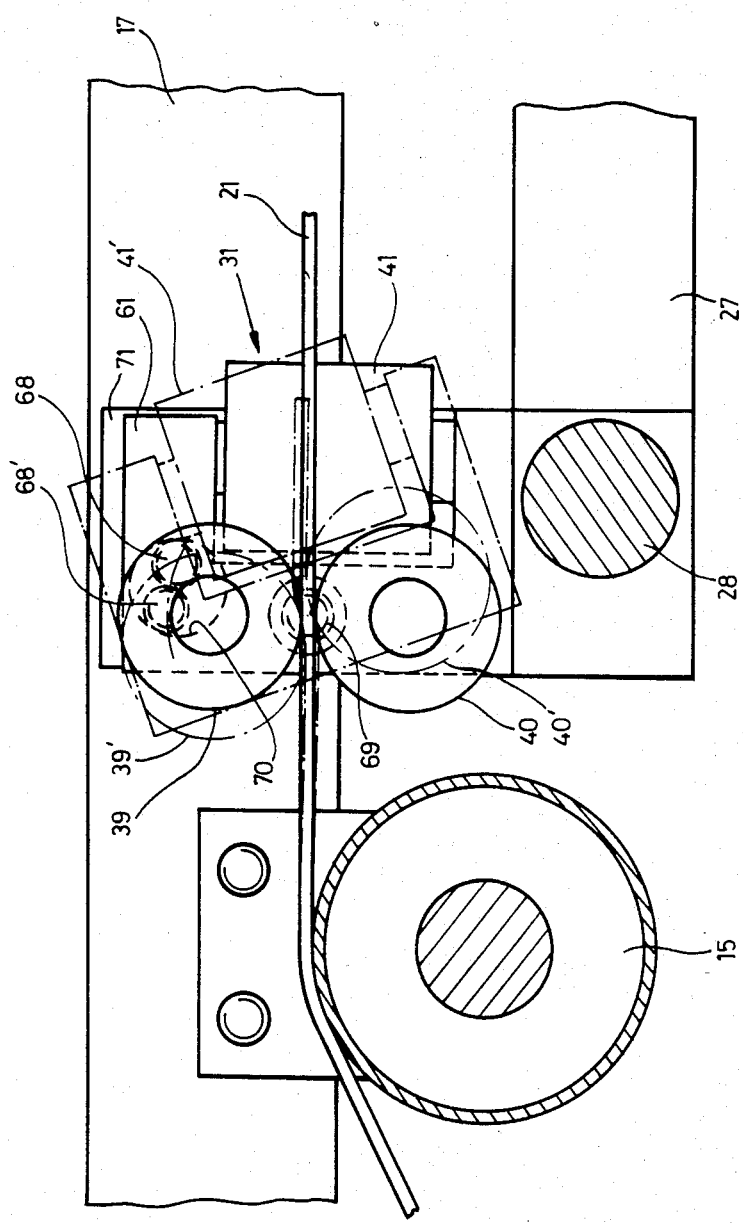
FIG. 5 is a cross-sectional view taken along the lines V—V of FIG. 2.

As best illustrated in FIG. 5, the body 61 of the bearing housing such as 31 can be shifted in a counterclockwise direction between a position with no angular offset in which the axis of the rollers 39 and 40 are substantially in a vertical plane to the maximum offset which is illustrated in the chain lines. By shifting the housing such as 31 between the upright position in a counterclockwise direction toward the angular position, the amount of contact between the roll surface and the web such as 21 is increased. Thus, it should be noted that this rotating or pivoting of the body 61 on the axis of the threaded fastener screw 69 will change the roller 39 to a position 39' and the roller 40 to a position 40'. In a similar manner, the lateral roller 41 will shift to a position 41'.

As best illustrated in FIG. 5, a belt 21 first will pass over an idler roll 15, then between the pressure rolls 39 and 40 with its edge being engaged by the lateral roller 41. Then as best illustrated in FIG. 1, the web will pass under the rollers of the first roll means 35 and then over the rollers of the second roll means 32. The longitudinal corrections of this endless belt 21 is done automatically when it shifts laterally from its theoretical center line because of the forces acting on the lateral guiding rolls 41, in combination with the forces on the pressure rolls 39 and 40 as well as the first and second roll means. Thus, any lateral shifting will cause pivoting of the subframe of the guiding device 23, which pivoting will urge the web 21 back to its theoretical center line position. The fact that the first and second roll means are composed of two rolls that can each rotate independent of each other, facilitates the correcting by allowing each of the two rollers to run at slightly different speeds such as a differential without applying a shifting force on the belt. It should be noted that the device 22, which is utilized for the lower conveyor belt is of the same structure as the device 23 and that both of these devices will insure a correct guiding of an endless belt without danger of damaging its edges or of damaging the guiding elements.

Although various minor modifications may be suggested by those versed in the art, it should be understood that we wish to embody within the scope of the patent granted hereon, all such modifications as reasonably and properly come within the scope of our contribution to the art.

We claim:

1. A device for longitudinally guiding an endless web, said web being disposed in a conveyor frame having at least one cross plate, said device comprising a subframe having a pair of side members with a cross-member spaced inward of one end, each side member at said other end having a bearing housing with a pair of pressure rollers for engaging opposite surfaces of the web and a lateral guiding roller mounted on an axis perpendicular to the axis of the pressure rollers; first roll means mounted above the cross-member for engaging an upper surface of the web; second roll means mounted at said one end for engaging the lower surface of the web, each of said first and second roll means having an axle extending between the side members of the subframe with a pair of rollers which are mounted thereon for independent rotation and have a width approximately one-half the distance between the side members; and pivot means for mounting the subframe on the cross plate of the conveyor frame for rotation about a pivot axis disposed on the theoretical center line of the endless web and passing through the center of the theoretical axis of the first roll means, said pivot means including a bearing arrangement between said cross-member and cross plate and a pair of rollers mounted on the subframe at the cross-member for engaging the cross plate so that the endless web is pressed between the pressure rollers before it passes underneath the rollers of the first roll means and over the rollers of the second roll means.

2. A device according to claim 1, wherein each of the bearing housings is adjustably mounted on a support attached to the respective side frames by a first threaded fastener and a second threaded fastener, said second threaded fastener being received in an enlarged aperture of the support plate to enable pivoting of the housing around the first threaded fastener with the position being controlled by said second threaded fastener.

3. A device according to claim 1, wherein the bearing arrangement comprises a stud being secured to the cross plate and having a cylindrical bearing portion received in a bearing on the cross-member of the subframe and a spacer interposed therebetween.

* * * * *